Arthur A. Smith
Peter L. Green
Corbet M. Cornelison,
INVENTORS.

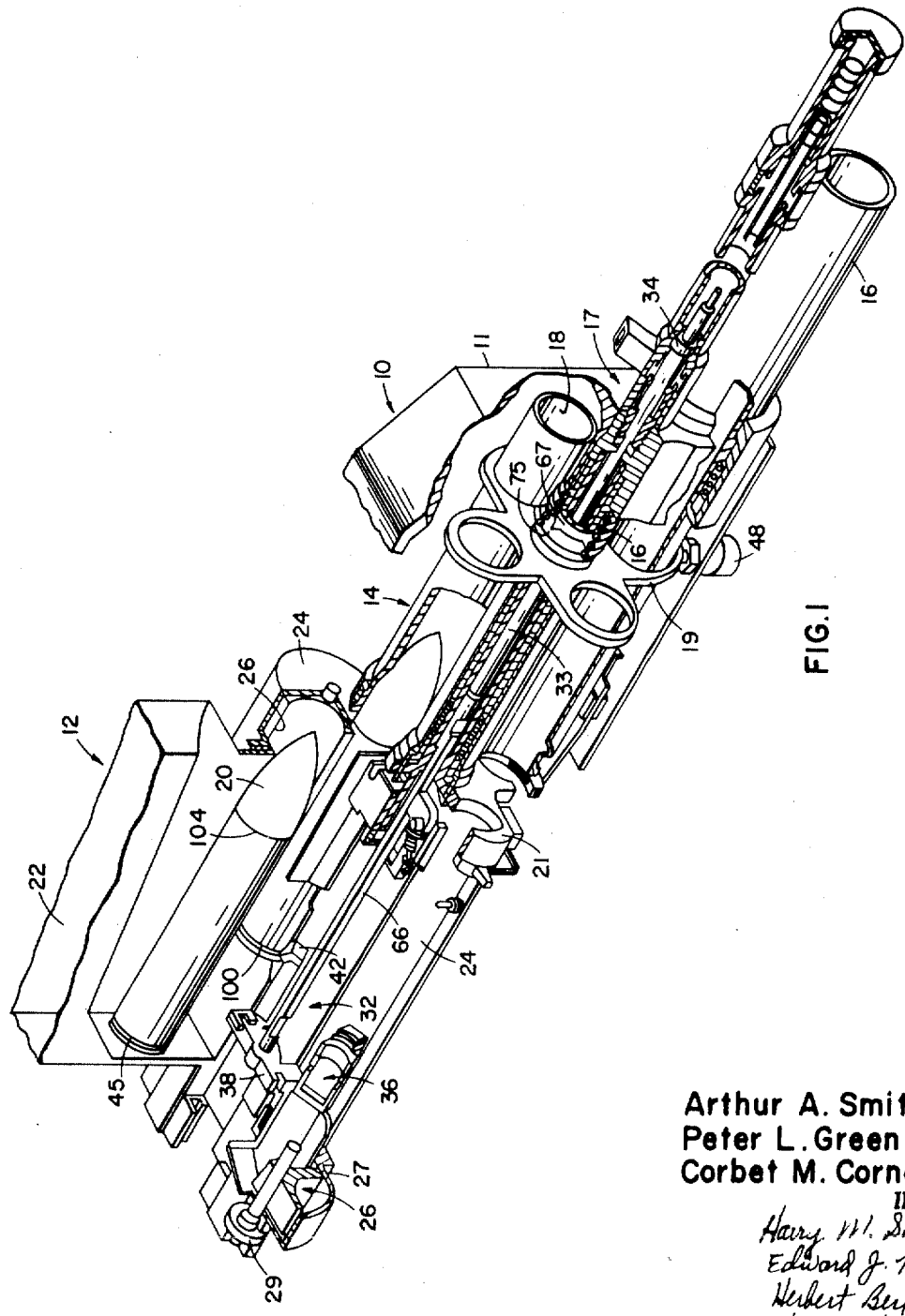

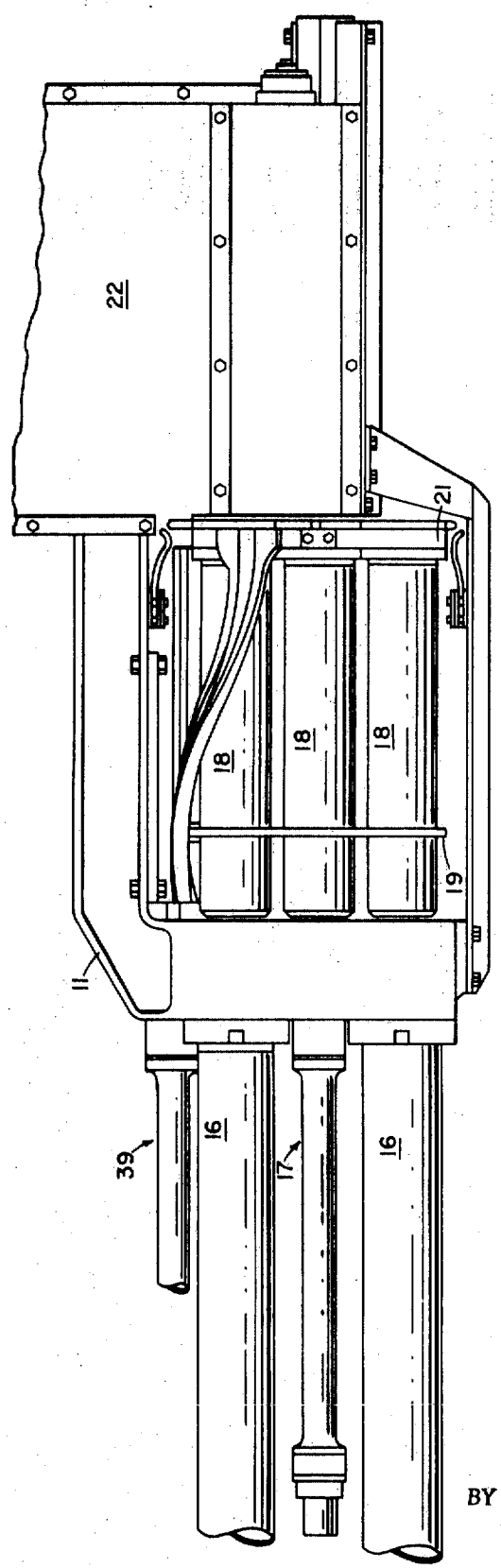

Arthur A. Smith
Peter L. Green
Corbet M. Cornelison,
INVENTORS.

Arthur A. Smith
Peter L. Green
Corbet M. Cornelison,
INVENTORS.
Harry M. Saragovitz
Edward J. Kelly
Herbert Berl
Harold W. Hilton Arthur A. Smith
Peter L. Green
Corbet M. Cornelison,
INVENTORS BY Harry M. Saragovitz
Edward J. Kelly
Herbert Berl
Harold W. Hilton

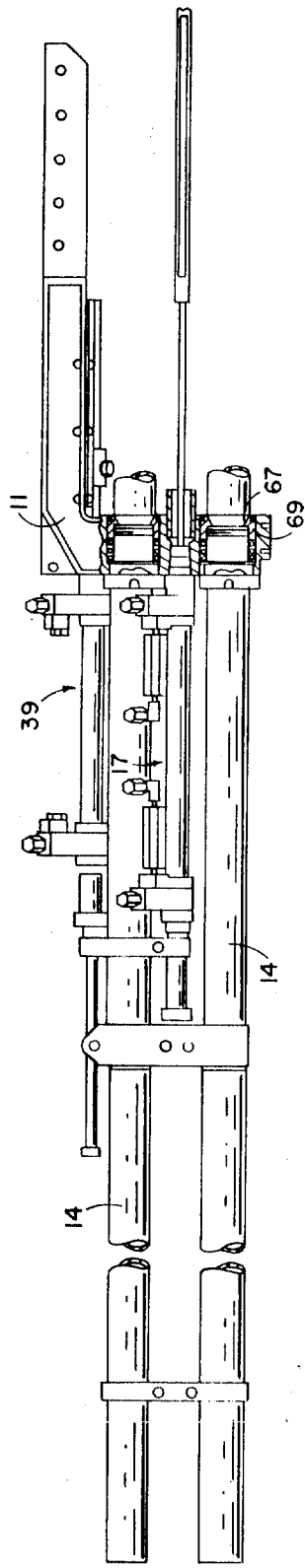
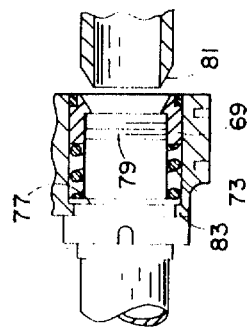
FIG. 9
FIG. 10
Arthur A. Smith
Peter L. Green
Corbet M. Cornelison,
INVENTORS.

United States Patent Office 3,618,452
Patented Nov. 9, 1971

3,618,452
OBTURATING MECHANISM FOR AN AUTOMATIC ROCKET LAUNCHER
Arthur A. Smith, Peter L. Green, and Corbet M. Cornelison, Huntsville, Ala., assignors to the United States of America as represented by the Secretary of the Army
Filed Nov. 3, 1969, Ser. No. 873,417
Int. Cl. F41f 3/04, 9/00
U.S. Cl. 89—1.804
7 Claims

ABSTRACT OF THE DISCLOSURE

A rocket launcher having a four barrel revolver from which a pair of rockets are fired while, simultaneously, a second pair is loaded therein in launching position. Mechanism is provided for obturating and deobturating the four barrel revolver into two launcher tubes to accomplish sealing between two of the revolver cylinders and the two launch tubes.

The launcher is an automatic high rate, open breech, dual tube launcher fed by a four cylinder revolver which generates rotary reciprocating motion. Two rounds are loaded and two rounds are fired each half cycle. A pair of hydraulic double acting cylinders actuated by a pair of solenoid valves serve to actuate the launcher. One hydraulic cylinder rotates the revolver to align the chamber with the launching tubes while the second hydraulic cylinder performs the loading operation, reciprocates the revolver into obturating position to seal and align the firing chambers with the launching tubes, and retracts to clear the seals and latch the rounds being loaded into the revolver chamber. A pulsing switch operated by revolver motion serves to actuate the hydraulic cylinders.

The rockets fired from the launcher may be the type which includes a propulsion system having a boost phase and an after boost sustain phase. The rocket boost phase occurs wholly within the launcher tube at all temperatures. The ignition system of the boost and sustain phases is incorporated in the system in a manner which insures that no debris (wires, metal parts, etc.) is ejected from the rear of the launcher tube on firing. Booster thrust termination and ignition of the sustainer motor occurs within the launcher tube and the tube serves as the combustion chamber for the motors.

SUMMARY OF THE INVENTION

The mechanism of the present invention is disposed for obturating and deobturating a four barrel revolver into two launcher tubes to accomplish sealing between two of the revolver cylinders and the two launch tubes. Obturation is accomplished by using the loader stroke to cause a cam dog assembly carried by the reciprocating hydraulic cam assembly to engage a pressure plate on the revolver assembly for reciprocal movement thereof.

It is, therefore, an object of the present invention to provide mechanism for obturating a pair of revolver chambers into two launcher tubes to accomplish sealing between the revolver cylinders and the two launcher tubes.

It is further object of the present invention to provide such a mechanism in a launcher in which a plurality of rockets are loaded in launching position simultaneously with the firing of another plurality of rockets.

Other objects and advantages will be apparent after a study of the following detailed description taken in conjunction with the drawings.

BRIEF DESCRIPTION OF THE DRAWINGS

FIG. 1 is a perspective view, partially cut-away, of the launcher having missiles loaded therein.

FIG. 2 is an elevational side view of the launcher of the present invention.

FIG. 9 is an elevational view partially in section, of the launch tubes and revolver in obturated sealed position.

FIG. 10 is an enlarged view of the sealing elements between the launch tubes and revolver cylinders.

DESCRIPTION OF THE PREFERRED EMBODIMENT

Figure 6:
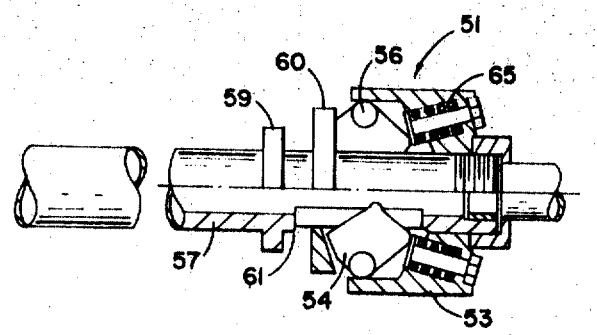
FIG. 6 is a plan view, partially in section of the cam dog assembly secured to the revolver support shaft.

As shown in FIG. 1, a rocket launcher 10 includes a frame 11, a loader mechanism 12, a rotatable reciprocal revolver section 14, a pair of launch tubes 16 (one of the tubes being removed for clarity in FIG. 1), and a hydraulic actuating assembly 17 for reciprocating movement of revolver 14. The revolver section includes four chambers 18 supported by a pair of yokes 19 and 21 concentrically around assembly 17. Two of the chambers are disposed for alignment with the launch tubes to fire rockets 20 therefrom while the other two chambers remain in a horizontal position until loaded with a second pair of rockets.

Figure 3:
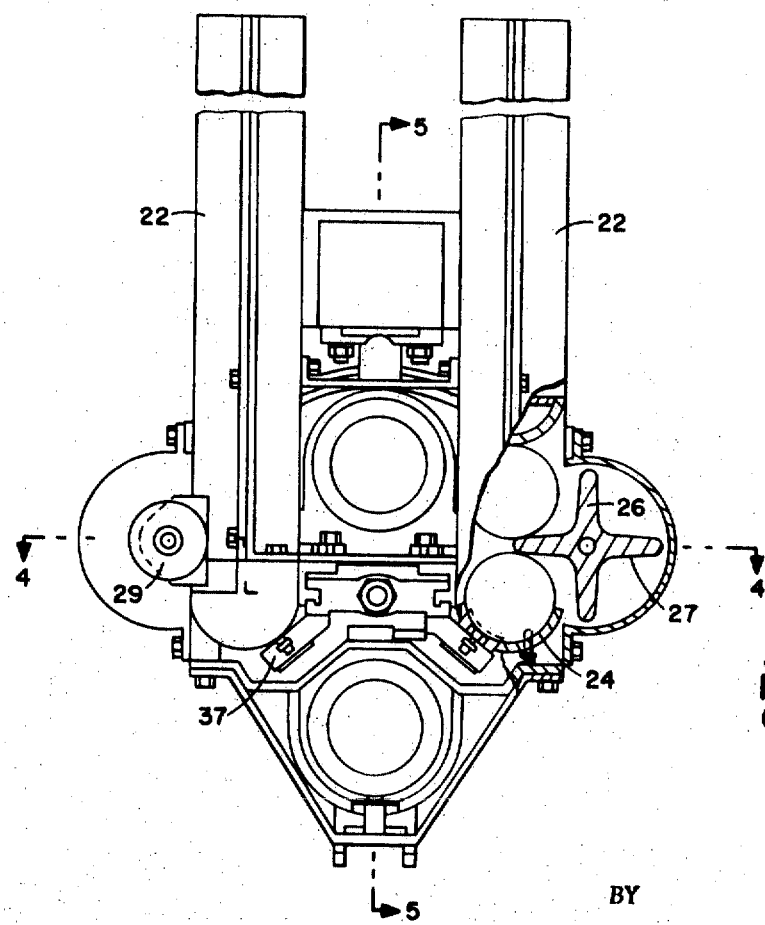
FIG. 3 is an end view, partially in section, of the launcher of the present invention.

The loader mechanism (FIGS. 1 and 3) includes a pair of loading chutes 22 and a pair of trays 24 communicating with the chutes. Each chute and tray is separated by a starwheel mechanism 26. The movement of the round is downward while in a horizontal position within the loading chute. Movement is effected by the combined force of gravity plus a leaf spring assembly (not shown) disposed in the top of the chutes. The motion of the rounds is intermittent, all rounds moving simultaneously after the bottom round is rammed forward into the revolver loading chamber. The bottom round is separated from the stack above by starwheels 26 which support the stack in a horizontal fashion to prevent jamming during the loading stage. The starwheel (FIG. 3) includes four spokes 27 and is made of nylon and engages the rocket along the whole cylindrical body longitudinally. As the starwheel turns, the next spoke of the starwheel positions between the round in the tray and the bottom round in the chute. This allows a low friction surface on which the round to be loaded can slide on without being in contact with the next round to come down. A form sprag clutch 29 permits only one direction of rotation of the starwheel, holds the round in the loader tray and aligns it with the revolver cylinder into which it is loaded. The two loading chutes straddle the rammer so that two rounds are handled jointly during each ram stroke.

Figure 4:
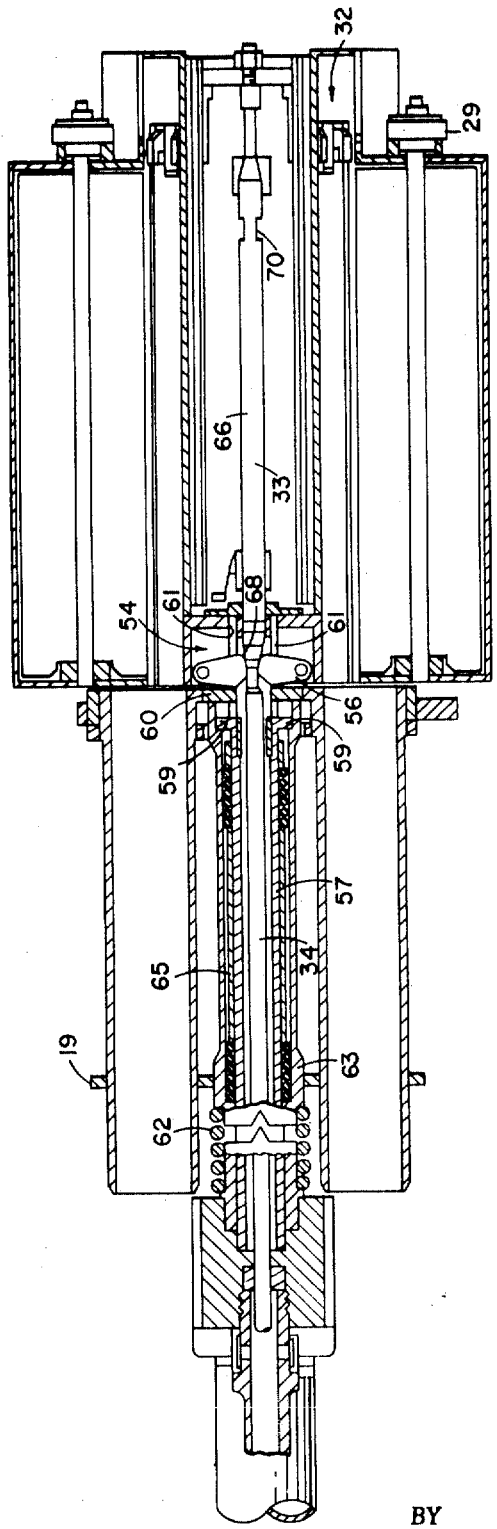
FIG. 4 is a sectional view along line 4—4 of FIG. 3.

To move the rounds into the revolver section, there is provided a loading mechanism 32 (FIGS. 1, 4 and 7) powered by a hydraulic piston 34 for forward and rearward movement of mechanism 32. Mechanism 32 includes a loader arm 33 connected to piston 34 for movement therewith and having a loader support member 38 secured at one end thereof. The piston and arm are mounted along the axis about which each revolver chamber 18 is concentrically disposed.

Figure 8:
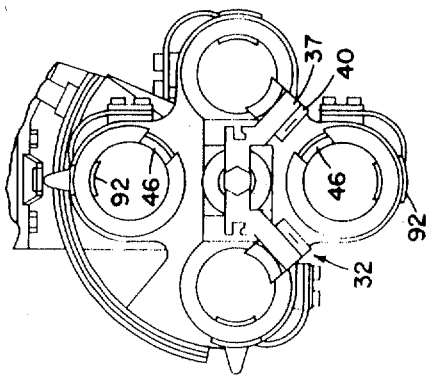
FIG. 8 is an elevational end view of the revolver section taken along line 8—8 of FIG. 7.

Loader support member 38 includes a pair of downwardly extending elements 37 (FIGS. 7 and 8) each having a loading member 40 at the ends thereof. A spring loaded loader detent 42 is provided at the forward end 44 of member 40 to rest in a detent ring 45 of the rocket (FIG. 1) when member 40 engages the rocket in the trays for loading thereof into the revolver, to maintain positive control over the round during the loading operation. Movement of piston 34 carries the loader assembly forward subsequent to engagement of the detent member 42 with the rocket and positions the rounds in the revolver chamber.

Figure 11:
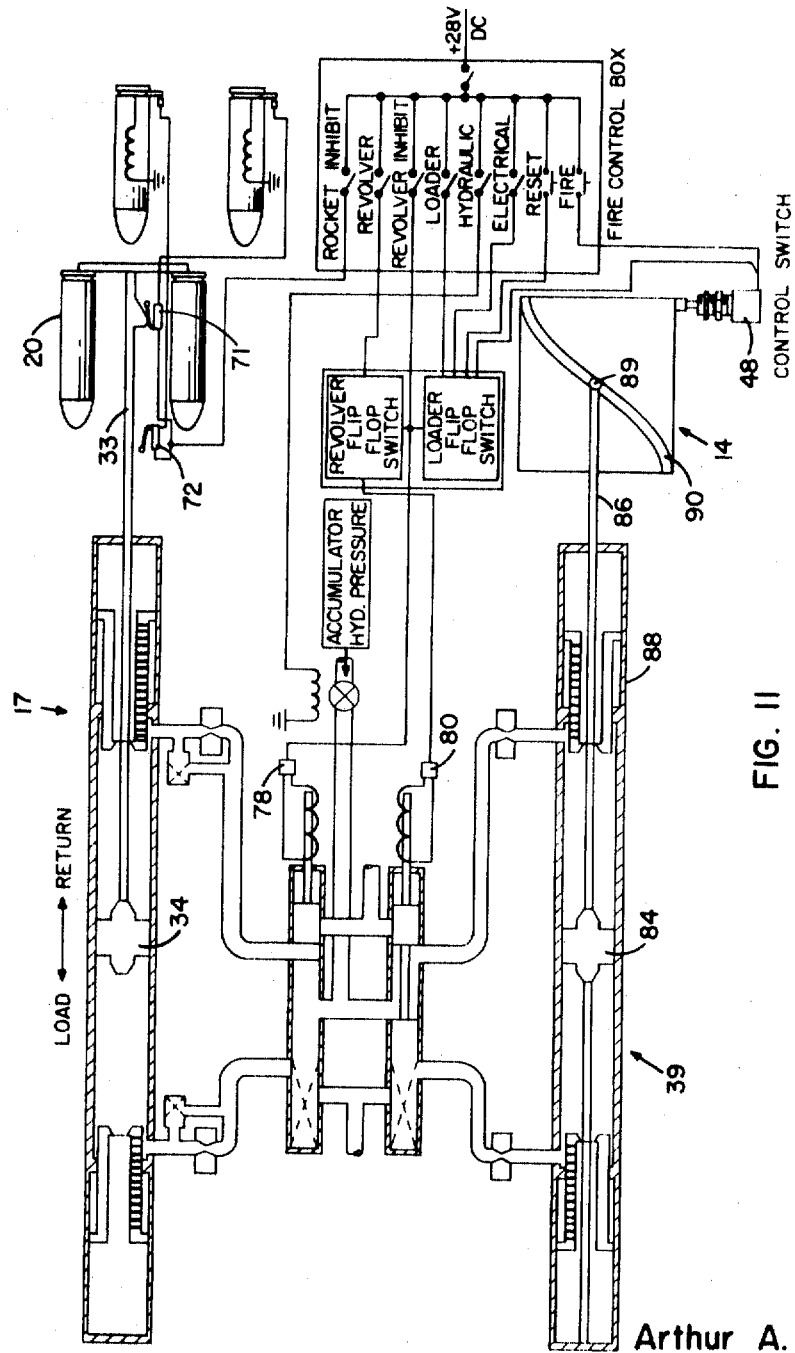
FIG. 11 is a schematic diagram of the launcher.

After the loader arm reaches the end of its stroke, the revolver chamber is unlatched and caused to move to the rear about ¼ of an inch to permit an angular surface 46 (FIG. 8) on the revolver chamber to engage loader detent 42 causing it to slide down and disengage from rocket detent 45. The face 48 of loading member 40 remains in position and holds the missile forward until the revolver reaches its rearmost position and locks into the round by a separate set of detents 92 (FIG. 8) mounted in the revolver cylinders for retention of the round in the revolver cylinder in a manner discussed hereinbelow. A revolver rotating hydraulic piston assembly 39 (FIGS. 7 and 11) then rotates revolver 14, 90° to align to two empty chambers wtih the loading trays and the loaded chambers with the launch tubes in a manner to be discussed below.

Figure 7:
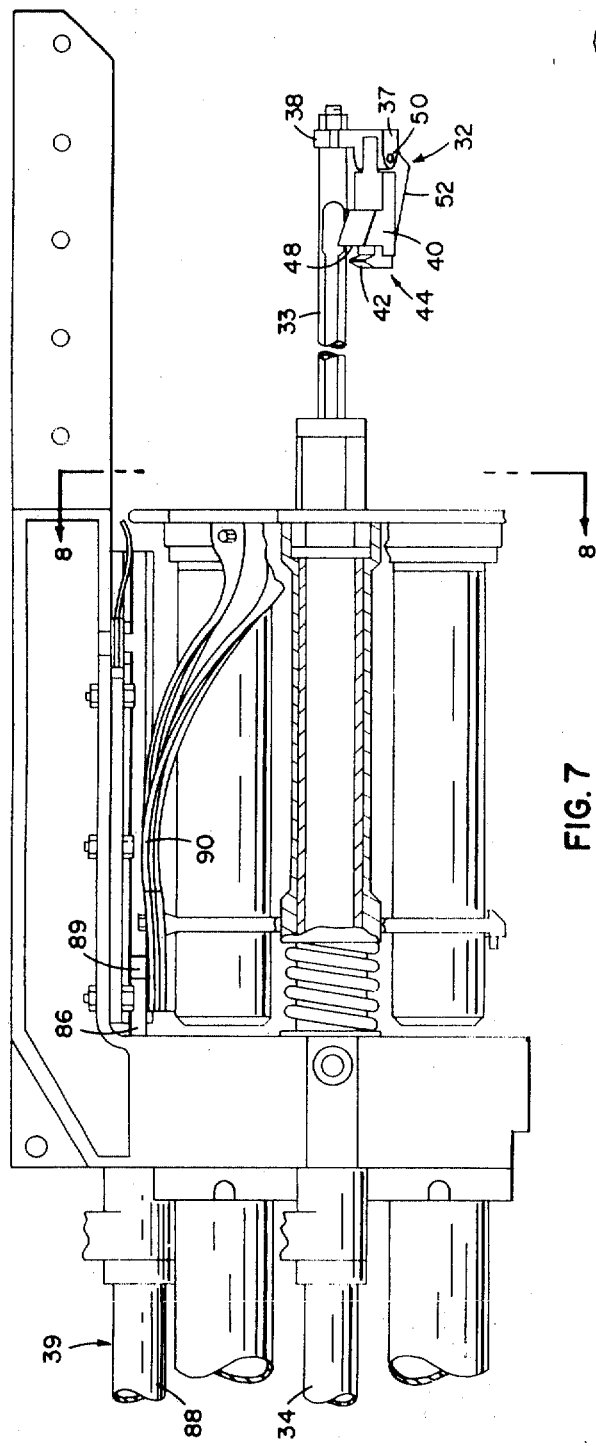
FIG. 7 is an elevational view partially in section of the revolver cam dog assembly and loader mechanism, the revolver being in unobturated position.

To permit the loader assembly 36 to return to pick up another round for loading thereof, the ram is moved rearward carrying the loading mechanism with it. As shown in FIG. 7, loading members 40 are pivotally mounted to support support member 38 at 50 and spring loaded by spring 52 in the support member to retain their initial positions for the loading action. As the loader retracts responsive to rearward movement of piston 32, members 40 are forced to pivot down and ride the body of the next rocket to be loaded, located in the loading trays. When the loader reaches its rearmost position, loading members 40 are biased upward by spring 52, back up behind the round detents 42 of members 40 rocket detent ring 45 for forward movement of the next pair of rockets.

With a pair of rockets in the chambers which are aligned with the launcher tubes, piston 32 and arm 33 move forward and carries with them the next pair of rockets to the other two chambers of the revolver. With the second pair of rockets in the chambers, piston 32 cooperates with obturating mechanism 53 for causing the revolver to obturate for sealing of the two vertical cylinders of the revolver with the two launch tubes.

The obturating mechanism utilizes the stroke motion of the rammer cylinder for operation thereof. The revolver must be forced forward for sealing of the two vertical cylinders of the revolver to the two launch tubes. The revolver must be held in this position until the rounds in these two cylinders are fired. The revolver must then retract such that it can be rotated 90° for alignment with the other two cylinders of the revolver with the launch tubes.

Figure 5:
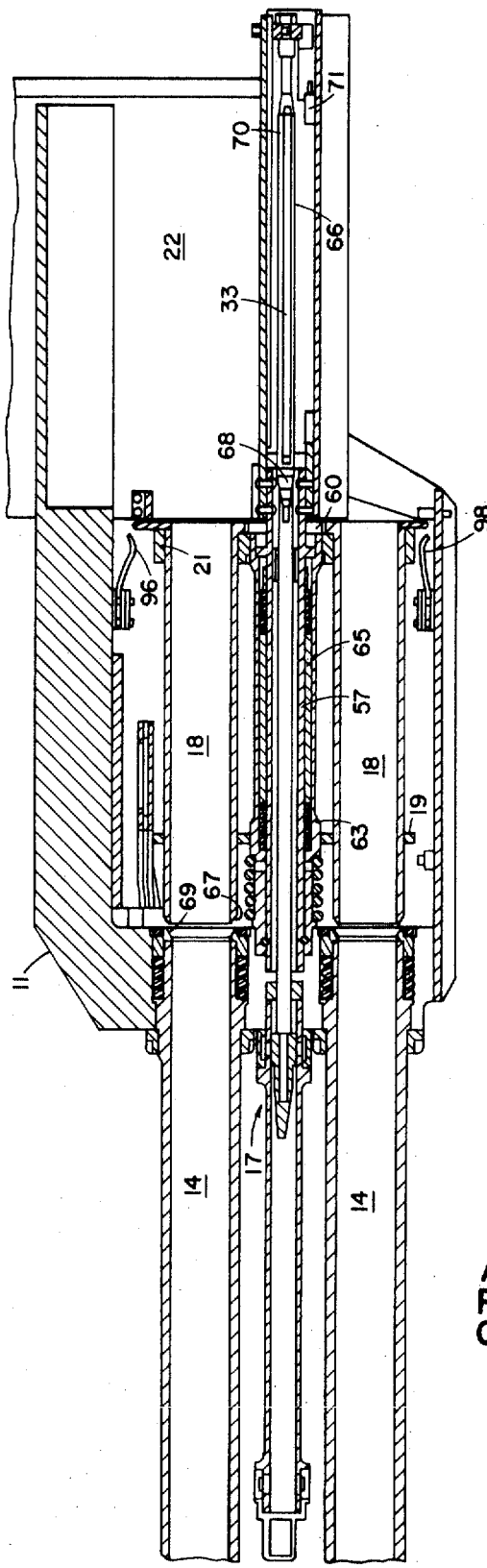
FIG. 5 is a sectional view taken along line 5—5 of FIG. 3.

To effect the forward and rearward movement of the revolver, the obturating mechanism includes a revolver support shaft 57 (FIGS. 4 and 5) which is concentrically disposed about piston 34 in axial relation with the ram cylinder. Support shaft 57 includes an annular flange 59 and an extending neck portion 61. A revolver chamber support tube 63 is slidably disposed about a sleeve-like member 65 which is circumferentially disposed about the support shaft 57 for reciprocal movement thereon.

The two yokes 19 and 21 are secured to opposite ends of support tube 63 and serve to secure the revolver chambers concentrically about the axis of the ram cylinder and loader arm. A pressure plate 60 is slidably disposed around neck portion 61 of support shaft 57 adjacent the rearward end of support tube 63 and flange 59 of support shaft 57 for engagement by a pair of cam dogs 54 of a cam dog assembly 51, (FIG. 6) for obturating displacement of the revolver section against the force of a spring 62 carried about hydraulic assembly 17. The cam dog assembly 51 includes a housing 53 secured around neck portion 61 of support shaft 57 and a pair of cam dogs 54 are pivotally mounted in the housing by pins 56. A pair of springs 65 mounted in housing 53 is disposed in biased relation with cam dogs 54.

Precise alignment of the firing chambers and launch tubes in the obturation position is provided by an obturation position cam 67 mounted on the center revolver support 63 mates with its counterpart cam 75 located on the central yoke 19 (FIG. 1). To provide positive pressure sealing of the chambers to the tubes, a pair of obturating seals 69 (FIGS. 9 and 10) are spring loaded by springs 73 against a seat 77 of the barrel chamber. Seals 69 are fitted with piston rings 79 and are provided with bevelled edges 83 for sealing engagement with complementary bevelled edges 81 of the revolver section.

To permit engagement of cam dogs 54 with the revolver section, loader arm 33 is provided on opposite sides thereof with a longitudinal cam 66 (FIGS. 1, 4, and 5) having a pair of recesses 68 and 70 at opposite ends thereof. When piston 32 and arm 33 move forward the cam dogs rise out of forward recess 68 to ride along longitudinal cams 66. In this position, the cam dogs are in engagement with pressure plate 60 of the revolver section, moving the revolver section forward into obturation position with the launch tubes.

Responsive to sealing engagement of the revolver cylinders and the launch tubes, a switch 71 (FIGS. 5 and 11) is tripped closed, by loader movement, to fire the rocket in the top launch tube. The ram piston 34 continues to a second position (while revolver and tubes are obturated) until a second switch 72 (FIG. 11) is tripped closed and the rocket in the bottom tube is fired. When the piston has reached the forward position of its stroke, the cam dogs fall into the rear recesses 70 of cam 66 and allows the revolver to be pushed back under force of spring 62. As the ram stroke retracts, spring 65 (FIG. 6) rotates cam dogs 54 in an opposite direction and allows the cam dogs to slide back along the cam track until they drop back into recesses 68. During deobturation a pulsing switch 48 (FIGS. 1 and 11) is depressed sending a signal to solenoid valves 78 and 80 (FIG. 11) which retracts piston 34 and initiates the next cycle by energizing the second assembly 39 to rotate the revolver.

To rotate the revolver after a pair of rockets have fired, the second piston assembly 39 (FIGS. 2, 7, 9, and 11) includes a piston 84 (FIG. 11) provided with a rod 86 which extends out of piston cylinder 88. Rod 86 is provided with a cam follower 89 at the end thereof which rides in a sinusoidal cam track assembly 90 disposed about the periphery of the revolver section. After the first pair of rockets have been fired a solenoid valve 80 (FIG. 11) is actuated to permit hydraulic fluid to move piston 84 of assembly 39 to rotate the revolver section to align the second pair of chambers with the launcher tubes. The same 90° arc is used clockwise and then counter-clockwise for each succeeding cycle of the launcher's operation.

The operating cycle requires that the rocket loader travel from full forward to full aft and full aft to full forward while the revolver hydraulic valve 80 is held in one position. The revolver must rotate while the rocket loader is traveling from full forward to full aft and must be held stationary while the rocket loader is traveling from full aft to full forward (i.e., the cycle ratio of the rocket loader valve 78 to the revolver valve 80 is 2:1). When the rocket loader begins forward travel from full aft, the revolver will forward obturate 0.25 inch and when the rocket loader reaches full forward position, the revolver will rear obturate 0.25 inch. The obturating motion of the revolver will operate pulsing control switch 48 which will provide electrical pulses to control the rocket loader. Ony the pulse from revolver rear obturate can be used to control the rotation of the revolver.

The pulses for control are obtained from control switch 48. The switch is closed as the revolver completes rotation, opens as the revolver forward obturates, closes as the revolver rear obturates and opens as the revolver begins rotation. The electrical control system is more fully set forth in Pat. No. 3,331,284, filed Feb. 4, 1966 by Frank H. Case, Jr., Edgar Losberg and Corbet M. Cornelison for "Electrical Control System for Recoilless Rifle."

The hydraulic actuating valves are two position, two stage solenoid operated, i.e., when the solenoid is energized the hydraulic fluid flows in one direction and when the solenoid is de-energized the fluid flows in the opposite direction.

The firing of the rockets is accomplished by closing the two firing switches, 71 and 72 as discussed above. After the rocket loader begins forward travel, the first switch 71 is closed completing the electrical circuit to the top rocket chamber, and as the loader approaches the end of forward travel the second switch 72 is closed, completing the electrical circuit to the bottom rocket chamber.

To insure that the electrical circuit to the rocket is not completed until the revolver forward obturates and to insure that only the two rockets which are aligned with the launcher tubes will fired, detent pins 92 (FIG. 5) are electrically connected to switches 71 and 72 respectively through a pair of firing springs 96 and 98 mounted externally of the revolver section. When the revolver rotates to its 90 degree rest position (in alignment with the launcher tubes) and forward obturates, the firing springs engage the detents of the chambers in alignment with the launch tubes. The detent pins are moved inwardly under spring force to engage a contact band 45 on the rocket (FIG. 1). At this point in the cycle, the ground contact and firing circuit contacts are closed, leaving only switches 71 and 72 open. The firing switches are closed responsive to loader movement as described, supra, and to launch the rockets in a sequence which permits the maximum time interval between the pair of rockets which is consistent with the ignition delays, thrust build up and gas evacuation times predicated by the rocket characteristics interrelated with the launcher.

Rocket 20 includes booster and sustainer motors and an obturating ring located just aft of the head of the rocket prevents booster motor gas blow-by and can act as the ground leg of the firing circuit. An ignition and retention ring secured to the nozzle assembly includes the contact band 45 which is electrically isolated from the metal parts of the missile and electrically connected to the squibs (not shown) in the booster and sustainer motors. The launcher detent pins 92 fit into the contact ring and holds the rocket in position during loading and cycling operations and completes the electrical circuit to squibs for firing the motors.

I claim:

1. An open breech, high rate, automatic rocket launcher comprising:
   (a) storage means having a plurality of rockets therein;
   (b) support means having a pair of launch tubes secured thereto;
   (c) a revolver section including a plurality of barrels each having a chamber therein, said revolver section disposed for rotary movement for alignment with said launch tubes and for reciprocating movement between said storage means and said launch tubes;
   (d) firing circuit means disposed for energization for supplying electrical energy to said rockets for ignition thereof;
   (e) loader means supported on said support means and disposed for reciprocal movement between said launch tubes and said storage means, said loader means being provided with a pair of loading members having detent means thereon for engagement with a pair of rockets carried in said storage means and for release of said rockets in said revolver responsive to movement thereto, said loader means further including a hydraulically actuated piston having a rod extending therefrom, said rod being provided on two sides thereof with a longitudinally disposed track having a recess at both ends thereof; and, a cam dog assembly including a pair of cams each disposed for movement out of a first pair of said recesses for movement along said longitudinal tracks for engagement with said revolver section responsive to displacement of said loader means for obturation relation of said revolver section and said launch tubes, said cams disposed for positioning in a second pair of said recesses for de-obturation of said revolver and said launch tubes;
   (f) obturating means for additional displacement of said revolver section to effect a sealed relation with said launch tubes responsive to the initial said reciprocal movement of said loader means.

2. A rocket launcher as set forth in claim 1 including biasing means disposed between said revolver section and said support means for biasing said revolver from said obturation position.

3. A rocket launcher as set forth in claim 2 wherein said obturation means includes a revolver support shaft secured to said support means in slidable surrounding relation with said piston rod, a pressure plate carried by said revolver support shaft adjacent one end thereof and adjacent one end of said revolver section, said cam dog assembly being disposed for engagement with said pressure plate for movement of said revolver support shaft for slidable movement thereof to effect the reciprocal movement of said revolver section.

4. A rocket launcher as set forth in claim 3 including obturating alignment cam means disposed on said revolver support shaft and said support means to effect precise alignment of said revolver chambers and said launch tubes.

5. A rocket launcher as set forth in claim 4 including sealing means disposed in said launch tubes to effect a gas tight seal between said revolver barrels and said launch tubes when said revolver barrels and said launch tubes are in obturated position.

6. A rocket launcher as set forth in claim 5 wherein said seal means includes a sealing member secured in said launch tubes and provided with bevelled edges, said revolver chambers having complementary bevelled edges for sealed relation with said bevelled edges of said sealing member.

7. A rocket launcher as set forth in claim 6 wherein said sealing members are provided with piston rings therein, and spring means carried in said launch in abutting relation with the inner end of said seal member.

References Cited
UNITED STATES PATENTS

| | | | |
|---|---|---|---|
| 2,777,365 | 1/1957 | Musgrave | 89—155 |
| 2,870,678 | 1/1959 | Girouard et al. | 89—47 X |
| 2,876,678 | 3/1959 | Lyon | 89—1.804 |
| 2,972,286 | 2/1961 | Marquardt | 89—155 X |
| 3,331,284 | 7/1967 | Case, Jr. et al. | 89—135 X |
| 3,505,927 | 4/1970 | Driscoll | 89—156 X |

SAMUEL W. ENGLE, Primary Examiner

U.S. Cl. X.R.

89—47, 126